United States Patent Office 3,099,688
Patented July 30, 1963

3,099,688
FLUORINATED SULFENYL HALIDES AND DISULFUR HALIDES
Carl G. Krespan, Wilmington, Del., assignor to E. I. du Pont de Nemours and Company, Wilmington, Del., a corporation of Delaware
No Drawing. Filed June 24, 1960, Ser. No. 38,415
5 Claims. (Cl. 260—543)

This invention relates to a new class of organic compounds containing fluorine and sulfur and to their preparation. More particularly, it relates to a new class of fluorinated organic sulfur halides and to a method for preparing them.

Organic sulfur halides as a group include sulfenyl halides and disulfur halides. These compounds have as a common characteristic a divalent sulfur atom of which one valence is bonded to a halogen atom. The number of sulfenyl halides or of disulfur halides which have been identified and characterized is small and for the most part disclosures of known compounds are directed to aromatic sulfenyl chlorides and bromides. Few open chain sulfenyl halides or disulfur halides are known and the descriptions of known products are limited to hydrocarbon types. Fluorinated open chain bis(sulfenyl halides) or bis(disulfur halides) are an unknown class of compounds.

The present invention provides a new class of compounds which are represented by the following generic formula:

(1) $\quad X-S_n-R_f-S_{n'}-X$ where X is halogen, $R_f$ is selected from the group consisting of divalent perfluorocarbon groups and divalent perfluorothiacarbon groups, and $n$ and $n'$ are positive whole numbers greater than zero and less than 4 (i.e., 1, 2 or 3); $n$ and $n'$ can be the same or different. Thus, using the same substituents and their respective meanings as given for Formula 1, when $n$ and $n'$ are 1, these compounds are represented by the formula (2) $\quad X-S-R_f-S-X$ and when $n$ and $n'$ are 2, the compounds are characterized by the formula (3) $\quad X-S-S-R_f-S-S-X$ In Formulas 2 and 3, $R_f$ and X have the meanings given earlier for Formula 1.

A common characteristic of the compounds, as shown in the above Formulas 1, 2, or 3, is the presence of two divalent sulfur atoms in which one valence of each sulfur is bonded to halogen and the other valance of each sulfur is bonded to a divalent radical. This radical consists of fluorine, carbon, and optionally divalent sulfur. The divalent radical can have the valences emanating from terminal carbons or terminal sulfurs and it can contain, as internal chain atoms, one or more divalent sulfur atoms which are bonded solely to carbon or sulfur by single bonds.

Hence, by the term "divalent perfluorocarbon group(s)" reference is had to conventional divalent open chain perfluorocarbon group(s). Such divalent perfluorocarbon group(s) are preferably saturated, that is, they are free of acetylenic and ethylenic bonds. Since straight chain groups are most readily obtained, they are especially preferred. Thus, an especially preferred perfluorocarbon is tetrafluoroethylene, —CF₂—CF₂—. Examples of divalent perfluorocarbon groups include broadly

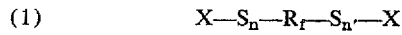
—CF₂(CF₂)₄CF₂—
—CF₂(CF₂)₆CF₂— and the like.

Similarly, by the term "perfluorothiacarbon group(s)" reference is had to divalent sulfur-interrupted open chain perfluorocarbon radical(s). The intervening perfluorocarbon radicals have the structure, $\text{-}(CF_2-CF_2)_n\text{-}$, where $n$ is 1, 2 or 3 and can be higher. Further in such perfluorothiacarbon moiety the sulfur can be present, for example, as sulfide (—S—), disulfide (—S—S—), trisulfide (—S—S—S—), tetrasulfide (—S—S—S—S—), and like groups where the free valences are bonded to carbon by single bonds. Examples of perfluorothiacarbon groups include —CF₂—CF₂—S—CF₂—CF₂—,

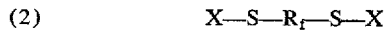
—CF₂—CF₂—S—S—CF₂—CF₂—
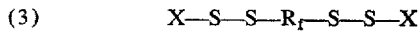

and the like. In a preferred group of compounds having a divalent perfluorothiacarbon group the interrupting sulfur is present as a monosulfide group, i.e., —S—.

It is noted that the term "perfluorocarbon" is used in its conventional sense to refer to a hydrocarbon in which all hydrogen atoms are replaced with fluorine atoms. Similarly, the term halogen is used in its conventional sense to have reference to chlorine, fluorine, bromine and iodine; preferred halogens are chlorine and bromine in this invention.

In the compounds of the invention, the number of such sulfide and polysulfide linkages can be small, as low as one, or the number can be large, i.e., the divalent sulfur-interrupted perfluorocarbon group can be polymeric, having a molecular weight above 1000, frequently above 5000, and a sulfur content which generally is between about 3% and 55% by weight of the product. The products derived from the polymers are mixtures having recurring single or multiple —CF₂—CF₂— units, i.e., the units can be (—CF₂—CF₂—)$_y$ where $y$ is a whole number of at least one and can be higher, e.g., 2, 3, or 4, and recurring sulfide units, i.e., (—S—)$_z$, where $z$ is 1–4. The products have, as characterizing terminal groups, the group —SX, as defined in generic Formula 1.

Thus, an especially useful class of compounds within the scope of this invention can be characterized by the formula (4) $\quad X-[S_m-(CF_2CF_2)_y-S_z-(CF_2CF_2)_y-S_m]S-X$ wherein $m$ is an integer less than 2 (i.e., zero or 1), $y$ is an integer greater than zero and less than 3 (i.e., 1 or 2), and $z$ is an integer smaller than 5 (i.e., zero, 1, 2, 3, or 4).

A preferred class of compounds of this invention are represented by the following formula which shows the composition of the preferred divalent radical:

(5) $\quad X-S[S_m-R'_f-S_p-R'_f-S_m]S-X$ wherein X is halogen, $R'_f$ is a divalent open chain perfluorocarbon group (as defined above), $m$ and $p$ are each cardinal numbers of at most 1 (i.e., $m$ and $p$ are each zero or 1 and the $m$'s are alike), and the sum of $2m+p$ is at most 2 (i.e., when $m$ is 1, $p$ is zero).

Specific compounds which illustrate broadly the class of new compounds of the invention are as follows: 1,1,2,2-tetrafluoroethane-1,2-bis(sulfenyl chloride); 1,1,2,2-tetrafluoroethane - 1,2 - bis(sulfenyl bromide); 1,1,2,2 - tetrafluoroethane-1,2-bis(disulfur chloride); 1,1,2,2-tetrafluoroethane-1,2-bis(disulfur bromide); 3-thia-1,1,2,2,4,4,5,5-octafluoropentane - 1,5-bis(sulfenyl chloride); 3 - thia-1,1,2,2,4,4,5,5 - octafluoropentane-1,5 - bis(sulfenyl bromide); 3-thia-1,1,2,2,4,4,5,5-octafluoropentane-1,5-bis(disulfur chloride); 3-thia-1,1,2,2,4,4,5,5-octafluoropentane-1,5-bis(disulfur bromide); 1,1,2,2-tetrafluoroethane-1-(sulfenyl chloride)-2-(disulfur chloride); 1,1,2,2-tetrafluoroethane-1-(sulfenyl chloride)-2-(trisulfur chloride); and 5-thia-1,1,2,2,3,3,4,4,6,6,7,7,8,8,9,9-hexadecafluorononane-1,9-bis(sulfenyl chloride).

The new compounds are liquids which are usually colorless although they may have occasionally a yellow tinge. The compounds have an acrid odor and they are heavier than water, i.e., the density of the liquids is greater than 1. The compounds react slowly with water, particularly when warmed, and they are preferably stored under conditions which exclude atmospheric moisture. The compounds are stable to storage for long periods in stoppered corrosion-resistant containers.

The compounds have good thermal stability and they can be distilled without significant decomposition. The higher boiling compounds are preferably distilled under reduced pressure.

The compounds are useful as intermediates for introducing perfluorocarbon or perfluorothiacarbon groups into organic compounds. The novel compounds normally react through the halogen of the sulfenyl halide or disulfur halide groups. The compounds react, for example, with olefins, organic disulfides, imides, and ketones.

The new compounds of the invention are prepared by reacting a halogen of atomic number 17–35 (i.e., chlorine or bromine) with a compound of tetrafluoroethylene and sulfur. Such compound is a member of the group consisting of (1) Monomeric perfluorinated cyclic polysulfides having adjacent annular sulfur atoms,
(2) A copolymer of tetrafluoroethylene and sulfur obtained by polymerization of the monomers of (1), and
(3) Copolymers of tetrafluoroethylene and sulfur having adjacent sulfur atoms, which are obtained by direct combination of tetrafluoroethylene and sulfur.

The preparation of cyclic polysulfide monomers, and the polymers which can be employed as reactants, is illustrated in later paragraphs.

The preferred reagents for use in the process are the perfluorinated cyclic polysulfides having adjacent annular sulfur atoms. These reactants are represented by the formula (6) 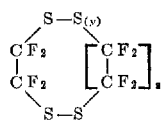

where $y$ and $z$ are cardinal numbers of zero to 1, with the proviso that when either number is 1, the other is zero, i.e., the sum of $y$ and $z$ is at most 1.

The cyclic polysulfides which are most readily available and which are, therefore, normally employed in the preferred process of the invention are (a) perfluoro-1,2,3-trithiolane (or perfluoro-1,2,3-trithiacyclopentane), (b) perfluoro-1,2,3,4-tetrathiane (or perfluoro-1,2,3,4-tetrathiacyclohexane), and (c) perfluoro-1,2,5-trithiepane (or perfluoro-1,2,5-trithiacycloheptane). The formulas for these reagent compounds, which are species of preferred compounds of generic Formula 6, are as follows:

(7) 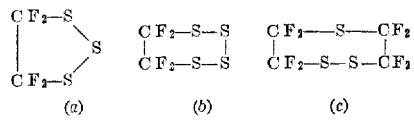

(a)      (b)      (c)

The above-described cyclic monomers are polymerized in the presence of a base, e.g., triethylamine, to linear copolymers of tetrafluoroethylene and sulfur which have polysulfide linkages, e.g., —S—S—, —S—S—S—,

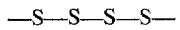

etc. These polymeric products are operable as reactants in the process of the invention.

Direct reaction of tetrafluoroethylene and sulfur, preferably under pressure and in the presence of a catalyst, provides tetrafluoroethylene/sulfur copolymers which also have polysulfide linkages and which can be used as reactants in the same manner as the polymeric polysulfides obtained by polymerization of cyclic monomers.

The process of reacting cyclic monomers or polymers with a halogen can be conducted in the presence or absence of water. When conducted in the presence of water, the process yields bis(sulfonyl halides) as well as the compounds of generic Formula 1, e.g., bis(sulfenyl halides) and bis(disulfur halides). The process, conducted in the absence of water, yields principally the compounds of Formula 1.

The bis(sulfonyl halides), obtained when water is present in the process, are represented by the following generic formula:

(8)         

where X and $R_f$ have the same meanings given earlier for Formula 1. The preparation of bis(sulfonyl halides) of Formula 8 by conducting the reaction in the presence of water forms a part of the invention.

Optionally, an inert solvent can be employed in the reaction to facilitate contact between the halogen and the perfluorinated polysulfide. Halogenated hydrocarbons, e.g., carbon tetrachloride, trichlorotrifluoroethane, chloroform, dichloromethane, and the like, are useful inert solvents. For processes which do not employ irradiation, hydrocarbons such as hexane and benzene can be used.

Catalysts can be employed, if desired, although the use of catalysts is not an essential or critical feature. An example of a suitable catalyst is iodine.

As stated previously, water can be employed as a reaction medium in the process and in this mode of operation it also serves as a reactant. The polyfluorinated polysulfide reagents are only slightly soluble in water and the reaction mixture in a process which employs water consists of two liquid phases. The products which are obtained and which are readily isolated are bis(sulfonyl halides), bis(sulfenyl halides), and bis(disulfur halides). There are also obtained, particularly with a polysulfide reactant of the structure of Formula b, mixed sulfenyl halide-polysulfur halide products, e.g., compounds of the structure Cl—S—CF$_2$CF$_2$—S—S—S—Cl.

The ratio in which the reactants are used is not critical. The halogen employed as one reactant appears in the final product bonded to sulfur and it is desirable, therefore, from the point of view of economics to use an excess of halogen. The ratio, moles of halogen/moles of perfluorinated polysulfide, will normally lie between about 0.2 and 5.0. Preferably, the mole ratio will lie between about 0.5 and 2.0. It is not essential, however, for operability that a particular range of mole ratios be used. The mole ratio which is employed will generally be the ratio which provides the maximum economic use of the perfluorinated polysulfide.

In the event water is employed as a reaction medium, either alone or in admixture with inert solvents, the ratio, moles water/moles perfluorinated polysulfide, will generally lie between about 0.5 and 20. Water can, in this mode of operation, be used advantageously in excess if it is desired to obtain the maximum yield of bis(sulfonyl halides). Thus, a preferred mole ratio of water to perfluorinated polysulfide will lie between about 1.0 and 10.0.

The reaction proceeds readily at normal atmospheric temperature or even at a relatively low temperature. Thus, the reaction can be conducted at a temperature of 0° C. or lower. In cases when the reaction is sluggish, heat can be applied to increase the rate of the reaction. Temperatures up to 100° C. or higher can be employed but the use of excessively high temperatures provides no significant advantage in the process. The temperature range will normally lie between about −20° C. and 100° C. A convenient and preferred temperature range lies between about 0° C. and 80° C. However, higher or lower temperatures can be employed to obtain the products. Heating of the reactants, if desired, can be accomplished by well-known conventional methods, e.g., by steam coils, electrical methods, by irradiation, and the like.

The reaction proceeds rapidly and the time for completion is not a critical factor. The time will be determined to a large extent by the temperature, thoroughness of mixing, quantities employed and by the manner in which the process is operated, i.e., whether batch or continuous. The time can, therefore, cover a wide range, e.g., from a few seconds' contact to as much as 18–24 hours' contact. In a continuous process, the time of contact is brief; in a batch process, the time of contact can be adjusted as desired.

In a continuous process, the reactants are supplied into one end of a reaction zone by a continuous feed and the reactants are removed from the other end. The desired end products are separated by distillation, crystallization, or other well-known methods from the reaction products and unreacted components are recirculated to the reaction zone.

The halogens employed in the reaction are readily available materials. Commercial products can be employed and they do not require special purification prior to use.

The reaction is conducted by relatively simple and conventional methods and elaborate or unusual equipment is unnecessary. In the simplest mode of operation, a corrosion-resistant reaction vessel is charged with the perfluorinated polysulfide (cyclic or polymeric) and the charged vessel is cooled to ice bath temperature, i.e., to about 10° C. or lower. Sufficient halogen is added to the reaction vessel to saturate the polysulfide and the reaction mixture is allowed to stand while it gradually warms to prevailing atmospheric temperature, e.g., about 25° C. The reaction mixture is then distilled through an efficient fractionating column to separate the bis(sulfenyl halide), the bis(disulfur halide) or a mixed sulfenyl halide-polysulfur halide product.

In another mode of operation, the mixture of halogen and perfluorinated polysulfide is irradiated, e.g., by a sun lamp or similar source of radiant energy, in a closed vessel to prevent loss of volatile reactants. Irradiation is employed to facilitate the reaction, but this technique is not essential for operability.

Perfluorinated cyclic polysulfides and polymers, employed as reactants, are obtained by several methods. In one procedure, a perfluoroalkene, e.g., tetrafluoroethylene, is brought into contact with sulfur vapors at a temperature of from about 350–450° C. and the cyclic polysulfides are removed continuously from the reaction zone. In a second method, tetrafluoroethylene and sulfur are dissolved in carbon disulfide and the solution is heated in a closed vessel at a temperature of at least about 250° C. The preparation of typical perfluorinated cyclic polysulfides and polymers is illustrated in Examples A, B, C, D, and E. The perfluorinated cyclic polysulfides and polymers so obtained are employed in the examples illustrating the process and the compounds of the invention.

*Example A*

A mixture of 16.0 g. (0.5 mole) of sulfur and 15 ml. of carbon disulfide is heated to 300° C. under autogenous pressure in an agitated pressure tube and 50 g. (0.5 mole) of tetrafluoroethylene is injected over a period of 5 hours, after which the mixture is heated at 300° C. for another two hours. Distillation of the reaction product gives (1) 8.8 g. of a mixture of carbon disulfide with a small quantity of perfluorothiolane and perfluoro-1,4-dithiane (2) 10.5 g. of pure perfluoro-1,4-dithiane, boiling 79–81° C., and (3) 52 g. of perfluoro-1,2,5-trithiepane, boiling at 71° C./100 mm.

*Example B*

A mixture of 64.0 g. of sulfur and 75 ml. of carbon disulfide is heated to 300° C. in an agitated pressure tube, and 100 g. of tetrafluoroethylene is injected continuously over a period of 2.5 hours. After another hour at 300° C., the tube is cooled and a small amount of gas is bled off. Distillation of the crude liquid product gives three fractions: (1) 84 g. of a colorless liquid, B.P. 30–46° C.;
(2) 4.5 g. of a yellow oil, B.P. 56–57° C. at 50 mm.; and (3) 54.4 g. of a yellow oil, B.P. 60–90° C. at 30 mm. There is also obtained (4) 25 g. of a waxy distillation residue and (5) 3.8 g. of a pale yellow solid which forms during distillation as a coating on the stillhead condenser.

Fraction (1) is primarily carbon disulfide and perfluoro-1,4-dithiane.

Fraction (2) is redistilled to yield 8.2 g. of perfluoro-1,2,5-trithiepane, B.P. 71–72° C. at 100 mm. On contact with a small amount of triethylamine, this product polymerizes readily to a waxy linear copolymer of tetrafluoroethylene and sulfur.

Fraction (3) is redistilled to give 10 g. of a viscous first fraction which is partially polymerized perfluoro-1,2,3-trithiolane; 21.8 g. of a yellow oil, B.P. 65–100° C. at 90 mm. which is essentially perfluoro-1,2,3,4-tetrathiane; and 20 g. of a viscous, light-colored residue consisting chiefly of low molecular weight tetrafluoroethylene/sulfur copolymers. The total distillate from fraction (3), which is thickened through polymerization when heated to 150° C., has a composition corresponding to the formula $C_2F_4S_{3.5}$, i.e., to a mixture of perfluoro-1,2,3-trithiolane and perfluoro-1,2,3,4-tetrathiane.

*Analysis.*—Calcd. for $C_2F_4S_{3.5}$: C, 11.32; F, 35.81; S, 52.87. Found: C, 11.72; F, 36.37; S, 52.37.

A portion of this distillate is redistilled. The second distillate, B.P. 30–40° C. at 10 mm., polymerizes at once on treatment with a few drops of triethylamine. There is thus obtained a tetrafluoroethylene/sulfur copolymer containing 36.25% fluorine and 52.55% sulfur. This polymer is dissolved in chloroform and is reprecipitated by addition of methanol. The composition of the polymer is not substantially changed by this treatment.

Fraction (4) is also a tetrafluoroethylene/sulfur copolymer, as is fraction (5), the latter forming during distillation of the liquid reaction product. This product has a composition corresponding approximately to the formula $(C_2F_4S_{2.5})_x$.

*Analysis.*—Calcd. for $(C_2F_4S_{2.5})_x$: F, 42.4; S, 44.5. Found: F, 40.86; S, 45.78.

The polymer is dissolved in chloroform and is reprecipitated with methanol to obtain a product having substantially the same composition as before.

*Example C*

A glass reaction vessel (one liter capacity) is employed which is provided with an inlet tube and an upright outlet neck 35 cm. in length and 25 mm. in diameter. The vessel is charged with 900 g. of sulfur which is then heated to the refluxing point of sulfur, about 445° C. at atmospheric pressure. The upright outlet neck serves as a condenser for the sulfur vapors. The neck is connected to a trap cooled to −80° C. through an air-cooled downward condenser. Tetrafluoroethylene is passed into the vessel through the inlet tube which is kept just above the surface of the molten sulfur. A total of 300 g. of tetrafluoroethylene is passed in over a period of three hours. Heating is regulated so that the temperature of the escaping reaction product at the head of the outlet tube is 300–330° C. The reaction is stopped after three hours and there remains 360 g. of untreated sulfur in the vessel.

The reaction products collected in the trap at −80° C. are distilled and there is obtained, as foreshots, 24 ml. of product boiling below 25° C. and 40 g. of less volatile but low-boiling liquid. The principal product is 579 g. of distillate which condenses at 25° C. and which is a liquid containing some solid material. The crude product is redistilled to give 540 g. of a mobile oil, boiling at 50–70° C./10 mm. which is collected in an acid-washed glass receiver.

The distillates obtained from several preparations are combined and fractionally distilled under reduced pressure in acid-washed equipment. Two fractions are obtained, the smaller one (A) boiling at or below 25° C. at 10 mm., the larger one (B) boiling at 52–53° C. at 10 mm. Fraction (B) is essentially pure perfluoro-1,2,3,4- tetrathiane. Fraction (A) is redistilled to give pure perfluoro-1,2,3-trithiolane, a mobile oil, boiling at 38–39° C./30 mm.

*Analysis.*—Calcd. for $C_2F_4S_3$: C, 12.24; F, 38.74; S, 49.02. Found: C, 12.36; F, 40.02; S, 48.25.

During distillation of perfluoro-1,2,3-trithiolane, the cyclic monomer partially polymerizes to give a solid tetrafluoroethylene/sulfur copolymer of the same composition as the monomer. The copolymer is washed with acetone, dissolved in toluene, reprecipitated by addition of petroleum ether and dried.

*Analysis.*—Calcd. for $(C_2F_4S_3)_x$: F, 38.74; S, 49.02. Found: F, 39.86; S, 48.40.

Pure perfluoro-1,2,3,4-tetrathiane, obtained from fraction (B), is polymerized by pouring 50 g. of the monomer into 140 g. of vigorously stirred acetone at about 25° C. over a period of two minutes. The resulting white gummy solid is washed with pentane, dissolved in toluene and reprecipitated by addition of pentane to yield 40 parts of a white, fluffy, solid copolymer of tetrafluoroethylene and sulfur.

*Analysis.*—Calcd. for $(C_2F_4S_4)_x$: C, 10.52; F, 33.31; S, 56.18. Found: C, 10.70; F, 34.07; S, 55.97.

The crystalline melting point of this polymer is 55–60° C., and its inherent viscosity in 0.1% solution in toluene at 25° C. is 0.68.

Example D

A pressure vessel whose inner surface is corrosion-resistant, is charged with 128 g. (4 moles) of sulfur and 75 ml. of carbon disulfide. The pressure vessel is closed, heated with agitation to 300° C. and 102 g. of tetrafluoroethylene are injected into the vessel over a period of 20 minutes at 300° C. and it is then cooled. A viscous reaction product is obtained which is distilled through an efficient fractionating column to remove initially 6.8 g. of perfluoro-1,4-dithiane, B.P. 80–81° C. and a small quantity of perfluoro - 1,2,5 - trithiepane. The residual liquid is distilled under reduced pressure to yield 50.5 g. of tetrafluoro - 1,2,3,4 - tetrathiane, a yellow oil, boiling at 70–85° C. at 30 mm.

Low temperature polymerization of tetrofluoro-1,2,3,4-tetrathiane is effected by cooling a solution of 0.1 g. of triethyl phosphite in 35 g. of pentane to —80° C., adding 8.5 g. of the monomer and allowing the mixture to stand for one hour at —80° C. The solvent is decanted, the polymer is dissolved in toluene, reprecipitated with pentane, washed with pentane and dried. There is obtained 2.5 g. of copolymer having an inherent viscosity of 0.67 in 0.1% solution toluene at 25° C.

Example E

A tetrafluoroethylene/sulfur copolymer is prepared directly by reacting sulfur with excess tetrafluoroethylene. A mixture of 6.4 g. of sulfur and 75 ml. of carbon disulfide is heated to 250° C. in a pressure tube and a total of 100 g. of tetrafluoroethylene is injected continuously over a period of 80 minutes. After removal of the volatile reaction products, there is obtained 5.7 g. of a tetrafluoroethylene/sulfur copolymer containing 12.4% by weight of sulfur. The polymer does not decompose when heated to 250° C.

The tetrafluoroethylene/sulfur reaction products, both cyclic monomers and polymers, obtained as described in Examples A–E can be employed as reactants to prepare the compounds of the invention, as illustrated in the following Examples I–V.

Example I

A glass reaction vessel is charged with 114 g. (10.5 moles) of perfluoro - 1,2,3,4 - tetrathiane, 500 ml. of water and 2 ml. of concentrated hydrochloric acid. The mixture is stirred and cooled to 0° C. The reaction vessel is connected to a supply of chlorine and 245 g. (3.5 moles) of chlorine are passed into the mixture over a period of three hours with stirring and cooling to maintain the temperature at —5° C. to 0° C. Nitrogen is then passed into the reaction vessel to sweep out the chlorine and the cold reaction mixture is poured into a separatory funnel. The lower layer of liquid which separates is removed, dried over anhydrous calcium sulfate, and filtered. The filtrate is distilled under reduced pressure through an efficient fractionating column to yield 61.6 g. of 1,1,2,2-tetrafluoroethane - 1,2 - bis(sulfonyl chloride), a liquid boiling at 77–78° C./30 mm., and 18.7 g. of 1,1,2,2-tetrafluoroethane - 1,2 - bis(disulfur chloride), a liquid boiling at 92–93° C./5 mm.

The disulfonyl chloride is further purified by crystallization from petroleum ether at —80° C. and redistillation of the crystallized product. It boils at 78° C./30 mm. and melts at 25–26° C. The identity of the compound, which has the formula 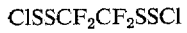, is confirmed by its nuclear magnetic resonance and infrered absorption spectra and by elemental analysis.

*Analysis.*—Calcd. for $C_2Cl_2F_4O_4S_2$: C, 8.03; Cl, 23.71; F, 25.41; S, 21.44. Found: C, 8.46; Cl, 23.50; F, 25.37; S, 21.96.

The bis(disulfur chloride) has the formula $$ClSSCF_2CF_2SSCl$$

and its identification is confirmed by nuclear magnetic resonance and infrared absorption spectra and by elemental analysis.

*Analysis.*—Calcd. for $C_2Cl_2F_4S_4$: C, 8.03; Cl, 23.70; F, 25.40; S, 42.87. Found: C, 9.02; Cl, 23.56; F, 26.20; S, 43.45.

Example II

A. A glass reaction vessel is charged with 100 g. of perfluoro - 1,2,3,4 - tetrathiane and 750 g. of chloroform. Chlorine gas is passed into the solution to saturate it over a period of four hours at prevailing atmospheric temperature (about 25° C.). The solution, which is orange-colored at this point, is cooled in an ice-water bath and the solution is again saturated with chlorine. It is allowed to stand overnight (about 18 hours) at ice-bath temperature. The reaction mixture is distilled to remove chloroform and sulfur dichloride which is formed as a by-product. The liquid which remains is distilled through an efficient fractionating column at 40 mm. pressure to yield 78.9 g. of 1,1,2,2-tetrafluoroethane-1,2-bis(sulfenyl chloride), a liquid which boils at 54° C./40 mm.; $n_D^{25}$, 1.4629. There is also obtained 6 g. of foreshots, boiling up to 54° C./40 mm. and 13.1 g. of tailings boiling at 54–55° C./40 mm. The identity of the bis(sulfenyl chloride) which has the formula

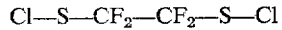

is confirmed by elemental analysis.

*Analysis.*—Calcd. for $C_2F_4S_2Cl_2$: C, 10.22; Cl, 30.17; F, 32.34; S, 27.28. Found: C,10.17, 10.32; Cl, 30.88; 3107; F, 30.65, 30.48; S, 28.53, 28.37.

B. In a second preparation conducted as described in Example II, Part A, 1000 g. of perfluoro-1,2,3,4-tetrathiane is chlorinated and the reaction product yields 800 of 1,1,2,2-tetrafluoroethane - 1,2 - bis(sulfenyl chloride).

Example III

A thick-walled tube (50 ml. capacity) of borosilicate glass is cooled to about —80° C. and it is charged with 14.2 g. of chlorine and 26.8 g. of perfluoro-1,2,5-trithiepane. The tube is sealed and it is placed in a fitted stainless steel mesh guard for protection against explosions. The charged tube is irradiated for 17 days with a conventional 275 watt 60 cycle, 110 volt sunlamp equipped with a reflector. No other source of heat is applied to the tube during this period. Following irradiation, the tube is cooled to a low temperature (about —80° C.), opened and connected to a trap which is cooled to —80° C. The tube is slowly warmed to 50° C. under slightly reduced pressure and about 3 ml. of unreacted chlorine is condensed in the trap. The residual liquid (34.6 g.) remaining in the tube is distilled under reduced pressure through an efficient fractionating column to obtain 4.83 g. of foreshots, boiling below 54° C./2 mm. and 23.82 g. of 3 - thia - 1,2,2,4,4,5,5 - octafluoropentane - 1,5 - bis-(sulfenyl chloride), a colorless liquid, B.P. 55° C./2 mm. The identity of the compound which has the formula $ClSCF_2CF_2SCF_2CF_2SCl$, is confirmed by nuclear magnetic resonance and by elemental analysis.

*Analysis.*—Calcd. for $C_4Cl_2F_8S_3$: Cl, 19.32.; F, 41.40; S, 26.20. Found: Cl, 19.23; F, 41.73; S, 26.59.

Example IV

A glass reaction vessel is charged with 5100 g. of perfluoro-1,2,3-trithiolane and the vessel and contents are cooled in an ice-bath to less than 10° C. Chlorine gas is passed into the vessel below the surface of the liquid until the trithiolane is saturated. A small amount of iodine (ca. 0.5 g.) is added to the liquid and passage of chlorine is continued until no more chlorine is absorbed. The reaction mixture is then allowed to stand overnight (about 18 hours) and it is then distilled through an efficient fractionating column. Sulfur dichloride, a by-product, is removed in the foreshots and there is then obtained 4200 g. of crude 1,1,2,2-tetrafluoroethane-1,2-bis(sulfenyl chloride), boiling at 120–140° C. at atmospheric pressure. The product is purified by further fractional distillation.

Example V

A glass reaction vessel is charged with 1000 g. of chloroform and 114 g. of polymer obtained from tetrafluoro-1,2,3,4-tetrathiane as described in Example D. The mixture is stirred until a clear solution forms and chlorine gas is passed into the solution while agitating. Chlorine passage is continued until 45 g. of chlorine is absorbed. The chloroform is then removed by distillation with simultaneous removal of the sulfur monochloride formed as a by-product. The liquid residue is distilled under reduced pressure through an efficient fractionating column and the following fractions are obtained:

| Boiling Range | Weight, g. | $n_D^{25}$ |
| --- | --- | --- |
| 53–57° C./40 mm | 30 | 1.4635 |
| 57–80° C./40 mm | 10 | |
| 80–120° C./40 mm | 62.3 | |

The products liberate iodine when reacted with aqueous sodium iodide, a reaction which is characteristic for sulfenyl chlorides and sulfur chlorides.

The process of Example V is applicable broadly to polymeric materials obtained by reaction of tetrafluoroethylene and sulfur, either directly or by polymerization of the polyfluorocyclic polysulfides.

Bromine can be used in place of chlorine in the process as illustrated in the examples. The bromine can be added to the polyfluorocyclic polysulfide or to the polymer reactant dropwise as a pure liquid or as a solution in an inert solvent (e.g., chloroform) or as a gas in the manner in which chlorine is added. By employing the process in the absence of water as illustrated in Examples II, III, and IV, bromine and perfluoro-1,2,3,4-tetrathiane react to yield 1,1,2,2-tetrafluoroethane - 1,2 - bis(sulfenyl bromide); bromine and perfluoro-1,2,5-trithiepane react to yield 3-thia-1,1,2,2,4,4,5,5 - octafluoropentane-1,5-bis(sulfenyl bromide). Bromine and perfluoro-1,2,3,4-tetrathiane react in the presence of water to yield 1,1,2,2-tetrafluoroethane-1,2-bis(disulfur bromide) and 1,1,2,2-tetrafluoroethane-1,2-bis(sulfonyl bromide).

The compounds of the invention are generically useful as intermediates for the preparation of polymers consisting principally of carbon, fluorine, and sulfur. Polymers can be obtained by a number of methods, e.g., by reacting with a metal which removes the halogens bonded to the sulfenyl, disulfur or polysulfur groups, or by simple heating of the appropriate sulfenyl halide, disulfur halide or polysulfur halide.

In a typical illustration employing a metal, a mixture of 50 parts of the compound of Example II, i.e., 1,1,2,2-tetrafluoroethane-1,2-bis(sulfenyl chloride); 40 parts of toluene, and 30 parts of mercury is thoroughly mixed for 72 hours. The reaction mixture, which now is viscous, is filtered and the filtrate is poured with vigorous stirring into 350 parts of pentane. The white precipitate which forms is separated and dried to yield 10 parts of a white polymeric material which in 0.1% solution in toluene has an inherent viscosity ($\eta_{inh}$) of 0.12 at 25° C. Elemental analysis shows that the polymer contains on the average one mole of tetrafluoroethane to two sulfur atoms.

*Analysis.*—Calcd. for $(C_2F_4S_2)_n$: F, 46.34; S, 39.02. Found: F, 45.52, 45.44; S, 39.62, 39.63.

In a typical procedure employing simple heating to effect polymerization, 50 parts of the sulfenyl halide obtained in Example II is refluxed for 72 hours at atmospheric pressure with precautions to exclude atmospheric moisture from the reaction vessel. After refluxing is stopped, low boiling material is removed by heating the reaction mass under reduced pressure. The residue is dissolved in chloroform and the solution is poured with vigorous stirring into pentane to precipitate a white polymeric product. There is obtained 12 parts of dried polymer with an inherent viscosity (0.1% solution in toluene at 25° C.) of 0.20.

*Analysis.*—Found: F, 42.73, 42.87; S, 43.81, 43.70.

Polymers can be obtained by reacting bis(sulfenyl halides or bis(disulfur halides) with an inorganic iodide. To illustrate, a mixture of 1.8 parts of 3-thia-1,1,2,2,4,4,5,5-octafluoropentane-1,5-bis(sulfenyl chloride), about 20 parts of acetone and 1.5 parts of potassium iodide is stirred for 15 minutes. The solution is filtered and the filtrate is diluted with 150 parts of water. The precipitate which forms is separated by filtration and dried. There is obtained 0.15 part of a soft plastic polymer.

As a further illustration of polymer formation, a mixture of 1.5 parts of 1,1,2,2-tetrafluoroethane-1,2-bis(disulfur chloride), about 20 parts of acetone and 1.5 parts of potassium iodide is stirred for 15 minutes. A precipitate which contains the polymer is formed and it is separated by filtration. The solid product is washed with ethanol and with water to remove by-product salts. There is obtained 0.2 part of a tan polymeric product which is insoluble in acetone, ethanol, and water. An additional quantity of polymer is obtained by diluting the filtrate from the initial reaction with water.

The polymers obtained from the bis(halosulfenyl) compounds of the invention are valuable treating agents for cellulose products to impart improved lubricity and water-repellent properties. For example, a sheet of cellulose is immersed in a 5% solution of the polymer obtained as described above by either procedure and the sheet is dried in air to remove all the solvent. The treated sheet has superior water-repellent properties and shows qualitatively much lower friction than an untreated sheet.

The bis(sulfenyl halides), bis(disulfur halides) and bis(polysulfur halides) of the invention obtained from the cyclic polysulfides and from the polymeric sulfides are generically useful directly as treating agents for cellulosic products to impart water-repellent properties. To illustrate, one section of filter paper is impregnated with 3-thia-1,1,2,2,4,4,5,5-octafluoroethane-1,5-bis(sulfenyl chloride) and a second section of filter paper is impregnated with 1,1,2,2-tetrafluoroethane-1,2-bis(disulfur chloride). The impregnated sections are heated on watch glass over a steam bath for one hour. Drops of water placed on the treated papers form beads which are not absorbed even after one hour of standing. Control sections of untreated paper absorb the drops of water immediately.

The new compounds of the invention are also generically useful as crosslinking agents for crepe rubber. To illustrate, approximately 0.15 part of 1,1,2,2-tetrafluoroethane- 1,2-bis(sulfenyl chloride) is added to about 2 parts of a 3% solution of crepe rubber in toluene. The solution, which prior to treatment is fluid, is stirred and it sets up to a gel. The gel is warmed on a steam bath for a short period and it is then added with stirring to methanol. The solid which precipitates is separated and washed with methanol. The product is a dark-colored crumbly mass which is no longer soluble in rubber solvents such as toluene.

The bis(sulfenyl bromides), bis(disulfur chlorides), bis(disulfur bromides) and bis(polysulfur bromides) of the invention can be used in the manner described above to form polymers, as crosslinking agents, and as agents for improving water-repellency of cellulosic products.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows.

I claim:
1. A compound of the formula
$$X-S_n-R_f-S_{n'}-X$$
where X is halogen, $R_f$ is selected from the group consisting of divalent, open chain, saturated, perfluorocarbon groups and divalent, open chain, saturated, fluorothiacarbon groups, and $n$ and $n'$ are positive whole numbers greater than zero and less than 4.

2. A compound of the formula
$$X-S[S_m-(CF_2CF_2)_y-S_z-(CF_2CF_2)_y-S_m]S-X$$
wherein X is halogen, $m$ is an integer less than 2, $y$ is an integer greater than zero and less than 3, and $z$ is an integer smaller than 5.

3. 1,1,2,2-tetrafluoroethane-1,2-bis(disulfur chloride).
4. 1,1,2,2-tetrafluoroethane-1,2-bis(sulfenyl chloride).
5. 3 - thia - 1,1,2,2,4,4,5,5 - octafluoropentane - 1,5-bis-(sulfenyl chloride).

References Cited in the file of this patent

Knunyants et al.: C.A., vol. 50, page 7069 (1956).
Reid: "Organic Chemistry of Bivalent Sulfur," volume 1, pages 265–272 (1958).
(Copies of above in Patent Office Scientific Library.)

UNITED STATES PATENT OFFICE
CERTIFICATE OF CORRECTION

Patent No. 3,099,688            July 30, 1963

Carl G. Krespan

It is hereby certified that error appears in the above numbered patent requiring correction and that the said Letters Patent should read as corrected below.

Column 12, lines 6 and 7, for "fluorothiacarbon" read -- perfluorothiacarbon --.

Signed and sealed this 7th day of April 1964.

(SEAL)
Attest:

ERNEST W. SWIDER

Attesting Officer

EDWARD J. BRENNER

Commissioner of Patents